United States Patent Office.

FRIEDRICH WICKE, OF BOCKENHEIM, JULIUS BRÖNNER, THEODOR PETERSEN, AND JOHANN GEORG ZEHFUSS, OF FRANKFORT-ON-THE-MAIN, PRUSSIA.

Letters Patent No. 100,347, dated March 1, 1870.

IMPROVED FERTILIZE FROM EXCREMENTRS.

The Schedule referred to in these Letters Patent and making part of the same.

We, FRIEDRICH WICKE, of Bockenheim, Prussia, sugar manufacturer, JULIUS BRÖNNER, manufacturer, THEODOR PETERSEN, chemist, and JOHANN GEORG ZEHFUSS, professor, all of Frankfort-on-the-Main, in the Kingdom of Prussia, have invented an Improved Method of Converting Human Excrements into a Scentless, Dry, Guano-like, and easily transportable body or substance, while preserving all their fertilizing properties, of which the following is a specification.

The object of our invention is to convert human excrements into a scentless, dry, guano-like, and easily transportable body or substance, while preserving all their fertilizing properties.

We attain our object by concentrating the excrements in vacuo by means of steam and of products of combustion, led in a heated state direct from the fire-places into the receptacle containing the excrements. We mix the mass as much as may be necessary to its complete disinfection, adding disinfecting or deodorizing substances, such, for instance, as calcined earth.

Claim.

We claim as our invention—

The concentration of the excrements in vacuo and the passing of hot gases from fire-places through the excrements, with or without addition of disinfecting substances.

FR. WICKE.
JULIUS BRÖNNER.
THEODOR PETERSEN.
DR. G. ZEHFUSS.

Witnesses:
U. VALENTINE KERTELL,
GEORG SARTORI.